United States Patent Office 2,812,254
Patented Nov. 5, 1957

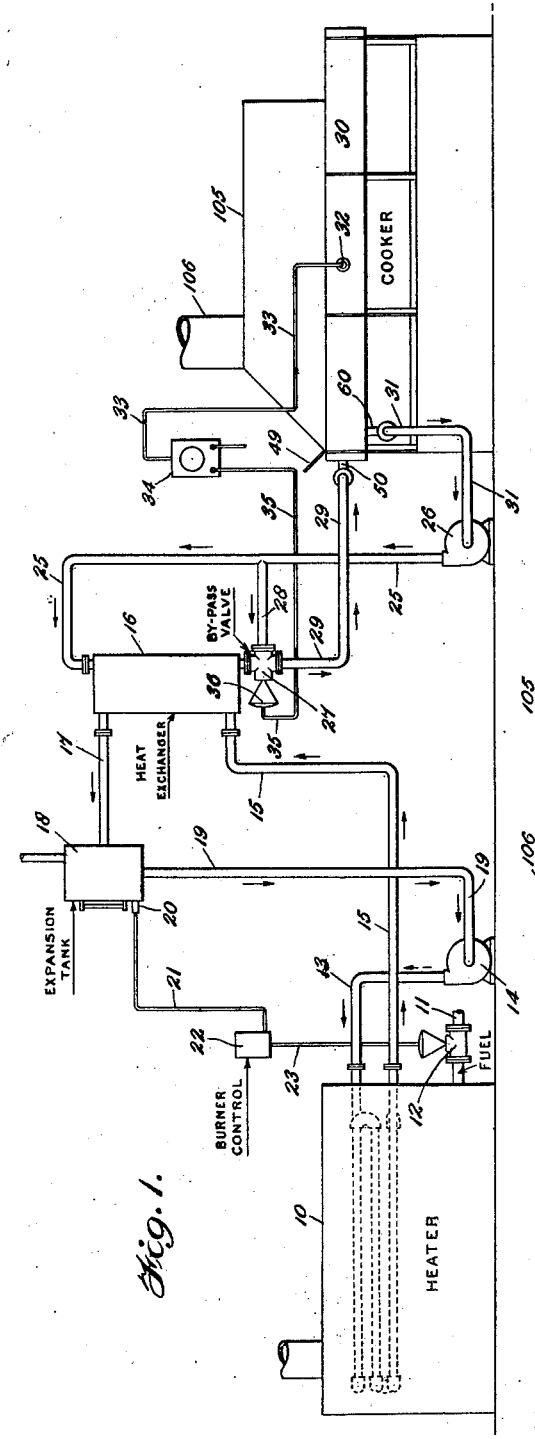

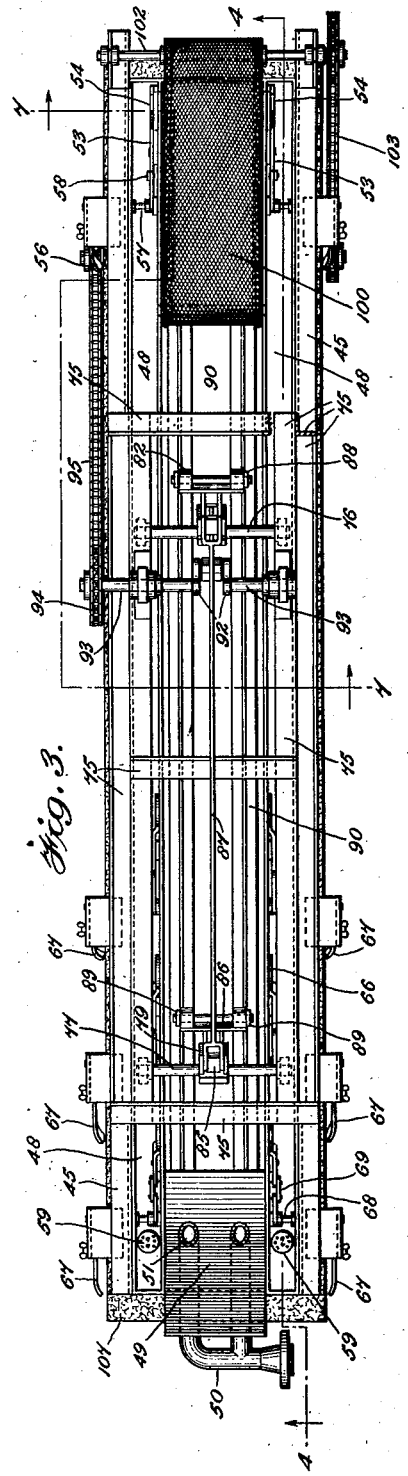

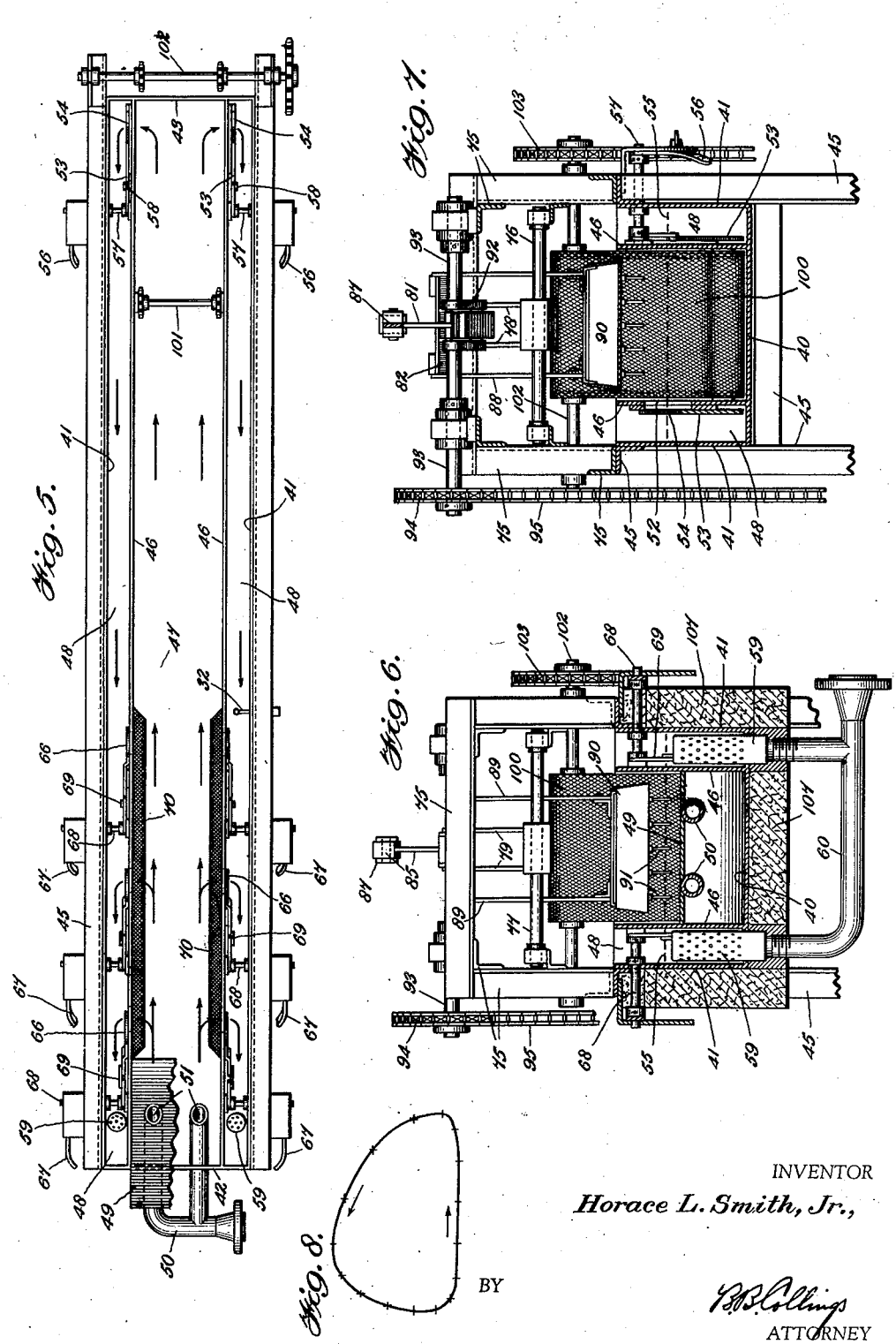

2,812,254

METHOD OF AND APPARATUS FOR CONTINUOUSLY COOKING POTATO CHIPS AND SIMILAR COMESTIBLES

Horace L. Smith, Jr., Richmond, Va., assignor to H. W. Lay & Company, Inc., Atlanta, Ga., a corporation of Tennessee Application May 12, 1952, Serial No. 287,363

8 Claims. (Cl. 99—100)

This invention relates to the cooking of food products, and has for its principal object the provision of an improved method and apparatus for the continuous production of potato chips and similar deep-fat cooked comestibles in a better, more efficient and less costly manner than has been heretofore proposed.

In the commercial production of potato chips the apparatus heretofore most generally employed for cooking the raw potato slices has comprised an elongated metallic vat or tank in which a body of a cooking medium such as a vegetable oil is heated to and insofar as possible maintained at temperatures of from 350° F. to 400° F. Means are provided at one end of such tank for introducing the raw potato slices into the cooking medium, and at its other end for removing the cooked chips therefrom, and usually traversing devices such as rotating paddle wheels or reciprocatory rakes are disposed intermediate the tank ends for effecting travel of the slices from the receiving end to the discharge end of the tank. The heating of the cooking medium is accomplished by the burning of fuel in a combustion chamber located beneath the tank, whereby the combustion products directly heat the tank bottom and through it the oil within the tank before escaping through a flue or stack communicating with said chamber.

While as above indicated, apparatus of this kind is in wide use, it leaves considerable to be desired, not only from the standpoint of its thermal efficiency but also because of its deleterious effect upon the cooking medium if it be operated in the manner necessary to attain its maximum production capacity. That the thermal efficiency is low is evidenced by the fact that although the temperature of the cooking medium in the tank in general ranges from 350° F. to 400° F., the temperatures of the combustion gases in the discharge flue or stack are on the order of 2,000° F. and higher.

Of even more importance however, is the detrimental effect on the cooking medium and product if it be attempted to supply, by this mode of heating, the heat necessary to cook the chips at a commercially desirable rate. That is to say, the vegetable oils commonly employed as cooking mediums, e. g., cotton seed oil, corn oil, etc., begin to break down at temperatures of from 450° F. to 500° F., with resultant scorching and development of free fatty acids, which detrimentally affects the flavor and/or color of the chips. However, the heat demand imposed on the cooking medium by the continuously fed raw slices is such that if the body of the medium within the tank, and more especially that portion adjacent the receiving end of the tank, is to be maintained at from 350° F. to 400° F., the tank bottom and the oil in contact therewith must be heated to temperatures well above the break-down point of the oil.

The heat requirements are not merely a matter of providing the sensible heat needed to raise the raw slices from room temperature to say 360° F. but also of supplying the latent heat necessary to vaporize the water content of the slices. At the time of the introduction of the slices into the tank their water content may be as high as 85% to 90% by weight, and inasmuch as it takes approximately 1,000 B. t. u.'s to evaporate one pound of water, it is obvious that the latent heat demand is high. Since the temperature of the slices can not rise above 212° F. until all of their water has been evaporated, which temperature is too low for rapid cooking, it is desirable that the evaporation take place as soon as possible after the introduction of the slices into the cooking medium. This throws a major portion of the heat load on the oil at the slice-receiving end of the tank, and in an effort to make the prior apparatus meet this demand it has been more or less customary to dispose all or most of the fuel burners beneath this part of the tank, whereby a major portion of the heat from the burning fuel will be supplied thereto. However, this expedient has not satisfactorily solved the problem, for notwithstanding the employment of various forms of burner control, if sufficient heat units are to be imparted to the oil to satisfy the latent heat requirements and prevent an undue drop in the temperature of the oil at the receiving end of the tank, the tank bottom and the oil in contact therewith must, as above stated, be heated to temperatures considerably in excess of the break-down point of the oil.

The present invention provides an apparatus for the continuous cooking of potato chips and similar food products of the deep-fat cooked type, which apparatus not only has an appreciably higher thermal efficiency than that above described, but also insures a continuous supply of oil at temperatures of from 350° F. to 400° F. to the receiving end of the cooking chamber, in such quantities as may be necessary to meet the sensible and latent heat demand, without any necessity for or danger of detrimental over-heating of the oil. It also provides a continuous flow of hot oil from the receiving end to the discharge end of the cooking chamber which in itself tends to carry the slices through the cooker, although this may be supplemented by mechanical devices if desired.

From the standpoint of thermal efficiency, liquid heaters of the tubular, coil and other types are far better than the bottom-heated tank described above, and the present system employs any appropriate or desired form thereof. However, in order to insure against over-heating and break-down of the cooking oil it is not directly heated by such heating unit but instead a heat-transfer liquid adapted to withstand temperatures substantially higher than those to which the cooking oil may be safely heated, is circulated through the heating unit and the heat there imparted to such transfer medium is transferred to the oil in a conventional heat-exchanger. The said oil, instead of remaining in the cooking tank as a more or less static body, is continuously withdrawn therefrom, pumped to the heat-exchanger and thence back to the tank, thus maintaining a constant circulation of hot oil through the tank; and the heat-transfer medium likewise is constantly circulated from the heating unit through the heat-exchanger and back to the unit.

A thermally responsive control device is associated with each of these liquid circuits, that of the oil circuit functioning to maintain the oil in the tank at a substantially constant temperature by causing the oil to either pass through or to by-pass the heat-exchanger according to temperature conditions in the cooker, while the other control device acts to regulate the supply of fuel to the heater burners in accordance with variations in the temperature of the heat-transfer medium. These controls are so arranged that although the temperature of the heat-transfer liquid may range from say 400° F. to 750° F., that of the cooking oil may never exceed say 500° F. in any part of its circuit; and the liquids are pumped through their respective circuits at rates designed to insure a continuous supply of hot oil to the comestible-receiving end of the cooking chamber in quantities sufficient to adequately meet the sensible and latent heat demands of the comestibles fed thereto.

Various heat-transfer mediums possessing the properties necessary for satisfactory use in the present apparatus are commercially available, such for example as the chlorinated bi-phenyl and poly-phenyl products readily obtainable under the names "Aroclor," "Dowtherm," etc.

The cooking tank preferably is of a somewhat different construction than those heretofore employed, although it still embodies an elongated cooking chamber provided with suitable comestible feeding means at one end and product discharging means at the other. The hot oil from the heat-exchanger is introduced into this chamber at the feed end thereof for flow to its other end, and along each longitudinal side of the cooking chamber there is provided an oil-return duct or channel into which the oil may pass by way of ports in the chamber walls adjacent the discharge end, which ports preferably have adjustable weirs associated with them whereby to control the oil level in the chamber. In the said return channels the oil flows in a direction opposite to that in which it travels in the cooking chamber, i. e., back to the feed end of the tank, where it is withdrawn for return to the heat-exchanger. The return of the oil through these channels tends to reduce heat losses through the side walls of the chamber, and in order to further conserve heat the outer side, bottom and end walls of the tank may be sheathed with asbestos or similar heat-insulating material. Adjacent the feed end the side walls of the chamber are provided with a plurality of valve-controlled ports affording communication between the chamber and the return channels, through which some of the oil may be short-circuited to the channels without passing completely through the chamber if temperature and/or flow conditions require it.

The oil flowing from end to end of the chamber naturally tends to carry the cooking chips with it; however, it may be desirable to supplement such movement and to this end a power-driven rake mechanism may surmount the tank intermediate its ends. Also, a hood to collect and carry off the odors of the hot oil may be disposed over the tank or a major portion thereof.

The apparatus thus generally described will be better understood by reference to the following detailed description of a typical installation such as is shown in the accompanying drawings forming a part of this specification, in which drawings like reference characters designate like parts in all the views and in which:

Figure 1 is a diagrammatic view illustrating the essential elements and the arrangement thereof constituting one form of the invention;

Fig. 2 is a side elevational view of the present cooking tank, the fume collecting hood being shown in section;

Fig. 3 is a top plan view, on a somewhat larger scale, of the tank shown in Fig. 2, the hood being omitted and the raking mechanism shown in a somewhat different position;

Fig. 4 is a longitudinal sectional view on approximately the plane indicated by the line 4—4 in Fig. 3, looking in the direction of the arrows;

Fig. 5 is a plan view of the cooking tank, with the hood and raking mechanism removed in order to more clearly show the cooking chamber and oil-return channels, and the flow of oil therein;

Fig. 6 is a cross sectional view, on a still larger scale, taken approximately on the planes indicated by the line 6—6 in Fig. 4, looking in the direction of the arrows;

Fig. 7 is a view similar to Fig. 6, taken approximately on the planes indicated by the line 7—7 in Fig. 3, the heat-insulating material sheathing the tank being omitted in this instance; and Fig. 8 is a diagrammatic view showing the path of travel of the rake mechanism provided for assisting in the movement of the chips through the cooking chamber.

Referring first more particularly to Fig. 1, 10 indicates a high-efficiency liquid heater of any appropriate conventional construction, fired by fluid fuel supplied thereto through a pipe 11 provided with an automatically operable control valve 12. The heat-transfer medium mentioned above is supplied to the coil or other heating conduit of the unit 10 by a pipe 13 leading from the discharge side of a rotary or other pressure pump 14, and said medium leaves the heater through a pipe 15 which extends to a conventional heat-exchanger 16. From the heat-exchanger the heat-transfer medium returns to the pump 14 by way of a pipe 17, and expansion tank 18 and a pipe 19, all as will be readily understood from said Fig. 1.

The expansion tank 18 is equipped with a thermometric device 20 which, through connections 21, a conventional burner control mechanism 22 and connections 23, actuates the fuel control valve 12 whereby to automatically regulate the burners of the heating unit 10 in accordance with the temperature of the heat-transfer medium in the return side of its circuit. In other words, as the temperature of the medium in the expansion tank rises above or falls below a predetermined value, the fuel valve 12 is correspondingly closed or opened automatically whereby the heater will supply less or more heat to the medium.

In the heat-exchanger 16 the heat carried by the transfer medium is transferred to the cooking oil, which is supplied to the unit 16 by a pipe 25 leading from a rotary or other suitable pressure pump 26. The heated oil leaves the heat-exchanger through an automatically controlled three-way valve 27, one port of which is connected with the pipe 25 by means of a by-pass pipe 28, and from another port of which a pipe 29 extends to the cooking unit, to be more fully described below. From this unit a return pipe 31 leads back to the intake side of the pump 26. A thermometer 32 extends through a side wall of the cooking tank 30 into one of the oil-return channels thereof, and the indications of said thermometer are transmitted through appropriate connections 33 to a conventional temperature recording and valve-control device 34 which, through fluid-pressure connections 35, actuates the diaphragm or other operating element 36 of the valve 27. This valve functions to apportion the flow of oil from pipe 25 to the heat-exchanger and around it through the pipe 28, whereby the temperature of the oil being supplied to the cooker 30 through pipe 29 may be varied in response to changes in the temperature of the oil flowing in the return channels of the cooker.

That is to say, if the temperature of the oil in said channels rises above a predetermined value, for example as a result of a lowering of the heat demand on the oil in the cooking chamber due to a reduction or interruption in the supply of raw slices, the regulator device 34 will actuate the valve 27 to partially or perhaps completely open the port communicating with the by-pass pipe 28, whereby some or all of the partially cooled oil flowing in pipe 25 will be by-passed around the heat-exchanger 16 through said pipe 28 and returned to the pipe 29 without re-heating, thus lowering the temperature of the oil being supplied to the cooker 30. When this lowered temperature of the incoming oil is reflected in the temperature of the oil in the return channels of the cooker the thermometrically controlled regulator 34 will move the valve 27 to partially or completely close the by-pass port, thus forcing a major portion or all of the oil in pipe 25 to traverse the heat-exchanger 16, and in this manner the temperature of the oil flowing in the cooking chamber may be held within relatively narrow limits.

Any reduction in the quantity of heat absorbed by the oil from the heat-transfer medium in the heat-exchanger 16, due to short-circuiting of the oil through the by-pass 28, will be reflected in an increase in the temperature of the medium in its expansion tank 18, and this temperature rise will cause the burner control device 22 to partially close the fuel valve 12 and thereby reduce the heat supplied to the transfer medium in the heating unit 10. The control devices 34 and 22 should be so set that the temperature of the oil in the cooker circuit can never reach the break-down point.

As above indicated the construction of the cooking unit 30 is appreciably different from those previously commonly employed. As will be best understood from Figs. 2–7, it comprises an elongated open-topped tank formed of metallic plates or sheets which provide a bottom wall 40, side walls 41, and end walls 42 and 43. This tank is supported by an angle-iron framework 45 and as best shown in Fig. 5, a pair of longitudinal partition walls 46 extend from end to end in spaced relation to the side walls 41, thereby dividing the tank into a medial cooking chamber 47 flanked along either side by a narrower oil-return conduit or channel 48. At the front or feed end of the tank, i. e., the left-hand end of Figs. 2, 3, 4 and 5, an inclined plate 49 extends down into the cooking chamber 47, providing a chute for receiving and conducting the raw potato slices into said chamber. Below this feeding plate or chute there is an oil-supply manifold 50 which is connected to the hot oil supply pipe 29 and which has a pair of legs that extend through the end wall 42 of the tank and the feed plate 49 to discharge the hot oil through ports 51 at substantially the point of entry of the raw potato slices into the cooking chamber.

Adjacent the end wall 43 of the tank each longitudinal partition wall 46 is provided with a port 52 (best seen in Figs. 4 and 7) affording communication between the cooking chamber 47 and the respective return channels 48. Each of these ports has associated with it a vertically swingable weir plate 53 having a V-shaped notch 54 registering with the port, and within the limits of adjustment of the weirs the oil level 55 may be maintained at any desired height above the tank bottom 40 by raising or lowering the said weirs. The weirs are manually adjustable by means of operating handles 56 located externally of the tank and carried by rock-shafts 57 which are connected to the weir plates 53 by linkage 58. The oil escaping from the chamber through the ports 52 to channels 48 flows back to the front end of the tank where it is discharged through suitable strainers 59 into an outlet manifold 60 that is connected to the return pipe 31 leading to the intake of the pump 26.

Provision is made however, whereby at least some of the oil may be short-circuited from the cooking chamber 47 to the return channels 48 without traveling completely through said chamber to the ports 52. As best shown in Fig. 4, adjacent the front or feed end of the tank, each of the partition walls 46 is provided with one or more ports 65 affording communication between the cooking chamber and the return channels. Each of these ports is controlled by an oscillatably mounted valve disk 66 which is manually adjustable in relation to its port by a handle 67 disposed externally of the tank and carried by a rockshaft 68 which is connected to the valve disk by linkage 69. Screens 70 disposed in front of the ports 68 prevent the potato slices or chips from escaping therethrough to the channels 48. By various adjustments of the several valves 66 the quantity of oil short-circuited through the ports 65 may be varied from zero to the maximum capacity of the ports, and in this manner the temperature of the oil in the forward portion of the cooking chamber as compared to that in the rearward portion thereof may be controlled as desired.

The flow of the cooking oil in the chamber 47 and return channels 48, and through the various ports between them, is clearly indicated by the arrows in Fig. 5.

As previously mentioned, while the flow of the oil in the cooking chamber in itself will carry the cooking chips from the feed end to the discharge end thereof, nevertheless it may be desired that this movement be aided by mechanically driven devices, and to this end a power driven reciprocatory rake mechanism has been shown as surmounting the tank intermediate its ends. This mechanism comprises an auxiliary frame or superstructure 75 secured to the tank or to its supporting frame 45, on which superstructure is journaled a pair of transverse longitudinally spaced rock-shafts 76 and 77, respectively provided with medially disposed pairs of upwardly extending arms 78 and 79. The upper ends of the arms 78 pivotally support an inverted-T-shaped lever structure 80 having legs 81, 82 and 83, while the upper ends of the arms 79 pivotally support an L-shaped lever structure 84 having legs 85 and 86. A link 87 connects the legs 81 and 85 of the respective lever structures, while the legs 82 and 86 thereof pivotally carry depending straps 88 and 89 the lower ends of which are connected to an elongated rake structure 90 disposed in the upper portion of the cooking chamber 47 and having a multiplicity of prongs or fingers 91 projecting downwardly from its under surface.

The leg 83 of the T-shaped lever structure 80 journals the pin of a crank 92 carried by a transverse shaft 93 which is rotatably mounted on the superstructure 75 and one end of which carries a sprocket 94 engaged by a chain 95 that is driven by a sprocket 96 carried by a jack-shaft 97 which in turn is driven by a chain-and-sprocket drive 98 from a motor 99 disposed below the tank structure. Rotation of the crank-shaft 93 in a clockwise direction (as viewed in Fig. 4) by the drives just described produces an oscillation of the lever structure 80 in relation to its supporting arms 78, which arms also are oscillated about the axis of their rock-shaft 76. These movements are transmitted by the link 87 to the bell-crank lever 84 and its supporting arms 79, producing movements of these elements which are the counterparts respectively of the motions of the lever 80 and arms 78. The movements of the levers 80 and 84 of course are transmitted to the rake structure 90 by the depending straps 88 and 89, and as a result the said rake structure is moved through a path substantially as shown in Fig. 8, whereby its fingers or prongs 91 are caused to dip into the oil in chamber 47 at the left hand end of the rake stroke, then moved rightward in a substantially straight line to the other end of the stroke, where they are elevated from the oil and returned to the starting point in a curved path as depicted by the upper portion of the said figure. During their rightward movement the prongs engage and move the chips with them, thus assisting the oil current in traversing the chips through the cooking chamber.

Means are provided at the rearward end of the apparatus for elevating the cooked chips from the chamber 47 and discharging them to any appropriate receiver. Such means comprise an endless foraminous belt conveyor 100 trained about a tail shaft 101 journaled in the cooking chamber below the oil level therein, and about a head shaft 102 mounted above and slightly to the rear of the end wall 43 of the tank. The said head shaft is continuously driven from the jack-shaft 97 by a chain-and-sprocket drive 103.

A hood 105 having an outlet flue 106 may cover all or a major portion of the tank for collecting and carrying off the fumes of the hot oil; and for heat conservation purposes it is desirable that the side, bottom and end walls of the tank be sheathed with asbestos or similar heat-insulating sheets or blocks 107.

What is claimed is:

1. In the cooking of water-containing raw comestibles in direct contact with a hot cooking oil to produce potato chips and analogous deep fat cooked food products, the steps which comprise continuously introducing said raw comestibles into a body of such oil for traverse therethrough; and maintaining a supply of heat units in the oil adequate to continuously rapidly evaporate the water content of the comestibles and bring them to the most efficient cooking temperature in a minimum time, by continuously withdrawing oil from said body, re-heating it extraneously thereof and returning it to the body at substantially the point of entry of the comestibles thereinto, and regulating said re-heating in inverse ratio to the temperature of the withdrawn oil to always maintain it below the break-down point of the oil.

2. In the cooking of raw comestibles by direct contact with a hot cooking oil to produce potato chips and analogous deep fat cooked food products, the steps which comprise continuously introducing the raw comestibles into a body of said oil for traverse therethrough; heating a liquid heat-transfer medium, having a normal vaporization point which is substantially higher than the break-down point of said cooking oil, to a temperature in excess of said oil break-down point; continuously withdrawing oil from said body thereof and passing it in heat exchanging relation to said heated medium to heat such oil; limiting the temperature of the so-heated oil at all times to below the break-down point thereof by varying the temperature of the heat-transfer medium; and continuously returning the heated oil to said oil body.

3. In the cooking of raw comestibles by direct contact with a hot cooking oil having a break-down point of approximately 450° F. to 500° F. to produce potato chips and analogous deep fat cooked food products, the steps which comprise continuously introducing the raw comestibles into a body of said oil for traverse therethrough; heating a liquid heat-transfer medium, having a normal vaporization point in excess of 500° F., to a temperature higher than said oil break-down point; continuously withdrawing oil from said body and passing it in heat exchanging relation to said heated medium to heat such oil; limiting the temperature of the so-heated oil to below the break-down point thereof by varying the temperature of the heat-transfer medium in inverse ratio to the temperature of the oil withdrawn from the oil body; and continuously returning the heated oil to said body.

4. In apparatus for the continuous cooking of potato chips and similar deep fat cooked comestibles in a heated cooking liquid, the combination of a liquid heater having regulating means for controlling the heat supplied thereby; a heat-exchange unit; connections between said heater and unit for conducting a heat-transfer fluid from the heater to the unit and back to the heater; means responsive to variations in the temperature of the heat-transfer fluid in portions of said connections for controlling said heater regulating means in inverse relation to said temperature variations; a tank providing a cooking chamber for containing a body of the cooking liquid; conduits connecting the heat-exchange unit with said cooking chamber through which the cooking liquid may be withdrawn from the chamber, conducted to said unit and returned to the chamber; and means responsive to changes in the temperature of the withdrawn liquid controlling the heating thereof in the heat-exchange unit whereby to correspondingly inversely vary the temperature of the returned liquid.

5. In apparatus for the continuous cooking of potato chips and similar comestibles in a heated cooking liquid, a tank for containing said liquid, said tank having vertical partition walls dividing it into an elongated cooking chamber and liquid return channels adjoining the sides thereof, into which chamber the comestibles are continuously fed at one end for longitudinal traverse to and discharge at the other end, said partition walls being provided with ports affording communication between the cooking chamber and said adjoining channels; means for continuously introducing the cooking liquid into the comestible receiving end of said chamber for flow therein and escape through said ports into said channels; adjustable means controlling said ports for volitionally regulating the passage of the liquid therethrough; and means for discharging said liquid from the channels.

6. In apparatus for the continuous cooking of potato chips and similar comestibles in a heated cooking liquid, a tank for containing said liquid, said tank having vertical partition walls dividing it into an elongated cooking chamber and liquid return channels adjoining and paralleling the sides thereof, into which chamber the comestibles are continuously fed at one end for traverse to and discharge at its other end, said partition walls being provided adjacent the respective ends of the chamber with ports affording communication between the chamber and said channels; means for continuously introducing the heated cooking liquid into the comestible receiving end of said chamber for comestible-transporting flow therein and escape through said ports into said channels; and means for discharging the liquid from said channels.

7. In apparatus for the continuous cooking of potato chips and similar comestibles, a tank for containing a heated cooking liquid, said tank having vertical partition walls dividing it into an elongated cooking chamber and liquid return channels adjoining and paralleling the sides thereof, into which chamber the comestibles are continuously fed at one end for traverse to and discharge at the other end, said partition walls being provided adjacent the respective ends of the chamber with ports affording communication between the chamber and said channels; means for introducing the heated cooking liquid into the comestible receiving end of said chamber for flow therein and escape through said ports into said channels; manually adjustable means controlling said ports for regulating the passage of the liquid therethrough; and means for discharging the liquid from said channels.

8. In apparatus for the continuous cooking of potato chips and similar comestibles in a heated cooking liquid, a tank for containing such liquid, said tank having vertical partition walls dividing it into an elongated cooking chamber and liquid return channels extending along the sides thereof, into which chamber the comestibles are introduced at one end for traverse to and discharge at the other end, said partition walls being provided adjacent the respective ends of the chamber with ports affording communication between the chamber and said channels; means for introducing the cooking liquid into the comestible receiving end of said chamber for comestible-transporting flow therein and escape through said ports into said channels; manually adjustable valves controlling the ports adjacent said receiving end of the chamber, whereby through the closing of all such valves all of the liquid may be caused to travel to the discharge end of the chamber and escape to the channels through the ports adjacent such end, and by opening said valves portions of the liquid may escape to the channels without completely traversing the chamber; and means for discharging the liquid from the channels.

References Cited in the file of this patent

UNITED STATES PATENTS

| | | |
|---|---|---|
| 701,622 | Ruff | June 3, 1902 |
| 1,234,131 | Cleveland | July 24, 1917 |
| 1,389,628 | Clark | Sept. 6, 1921 |
| 1,401,945 | Morris | Dec. 27, 1921 |
| 1,440,663 | Dunn | Jan. 2, 1923 |
| 1,476,839 | Pugh | Dec. 11, 1923 |
| 1,636,768 | Ford | July 26, 1927 |
| 2,041,175 | Goodman | May 19, 1936 |
| 2,111,285 | Haynie | Mar. 15, 1938 |
| 2,161,847 | Blodgett | June 13, 1939 |
| 2,176,624 | Ferry | Oct. 17, 1939 |
| 2,199,854 | Lagaard | May 17, 1940 |
| 2,207,316 | Ferry | July 9, 1940 |
| 2,231,114 | Ferry | Feb. 11, 1941 |
| 2,243,661 | Tota | May 27, 1941 |
| 2,249,792 | Skinner | July 22, 1941 |

(Other references on following page)

| | UNITED STATES PATENTS | | | 2,391,630 | Kibler _____ Dec. 25, 1945 |
|---|---|---|---|---|---|
| 2,286,644 | Pringle et al. | June 16, | 1942 | 2,549,575 | Conley _____ Apr. 17, 1951 |
| 2,287,396 | Roth | June 23, | 1942 | 2,715,869 | Salvo _____ Aug. 23, 1955 |
| 2,327,339 | Chandler | Aug. 24, | 1943 | | FOREIGN PATENTS |
| 2,375,870 | Ray | May 15, | 1945 | 473,545 | Canada _____ May 15, 1951 |